(12) United States Patent
Jeong et al.

(10) Patent No.: US 6,569,935 B2
(45) Date of Patent: May 27, 2003

(54) POLYOLEFIN-BASED COMPOSITE RESIN COMPOSITION HAVING LOW COEFFICIENT OF LINEAR THERMAL EXPANSION

(75) Inventors: Kie-Youn Jeong, Ulsan (KR); Yong-Sub Yoo, Daejeon (KR); Sung-Kun Jang, Daejeon (KR); Sung-Hoon Kim, Daejeon (KR)

(73) Assignee: Hyundai Motor Company, Seoul (KR)

( * ) Notice: Subject to any disclaimer, the term of this patent is extended or adjusted under 35 U.S.C. 154(b) by 123 days.

(21) Appl. No.: 09/751,093

(22) Filed: Dec. 29, 2000

(65) Prior Publication Data

US 2001/0006990 A1 Jul. 5, 2001

(30) Foreign Application Priority Data

Dec. 30, 1999 (KR) ............................................. 99-66381

(51) Int. Cl.⁷ .............................. C08J 3/00; C08K 3/34; C08L 23/00; C08L 51/00; C08L 23/04
(52) U.S. Cl. ...................... 524/456; 524/451; 524/449; 524/425; 524/447; 524/452; 524/494; 524/536; 525/240
(58) Field of Search ................................ 524/451, 456, 524/449, 425, 447, 452, 494, 536; 525/240

(56) References Cited

U.S. PATENT DOCUMENTS 4,094,854 A * 6/1978 Harada et al.
5,311,542 A 5/1994 Eder .............................. 375/1

FOREIGN PATENT DOCUMENTS

| EP | 0 496 625 | 7/1992 |
|----|-----------|--------|
| EP | 0 531 542 | 3/1993 |
| EP | 55724 | 8/1993 |
| EP | 0 557 124 | 8/1993 |
| EP | 0 596 621 | 5/1994 |
| KR | 99-033557 | 5/1999 |
| KR | 99-033558 | 5/1999 |
| KR | 99-039953 | 6/1999 |

* cited by examiner

Primary Examiner—Patrick D. Niland
(74) Attorney, Agent, or Firm—Christie, Parker & Hale, LLP

(57) ABSTRACT

The present invention relates to a polyolefin-based composite resin composition having a low coefficient of linear thermal expansion, wherein the composition comprises a) 40 to 80 weight % of crystalline ethylene-propylene copolymer, b) 5 to 40 weight % of ethylene-alpha-olefin copolymer, c) 5 to 30 weight % of calcium-metasilicate based wollastonite, and d) 5 to 30 weight % of inorganic reinforcing agent based on the total composition amount. The polyolefin-based composite resin composition having a low coefficient of linear thermal expansion not only has excellent mechanical rigidity, impact resistance, heat resistance, injection moldability, product flatness, and dimensional stability, but also has a low shrinkage, a low coefficient of linear thermal expansion, and a low heat sag. Therefore, it can be used for the manufacture of automobile exterior components.

10 Claims, No Drawings

POLYOLEFIN-BASED COMPOSITE RESIN COMPOSITION HAVING LOW COEFFICIENT OF LINEAR THERMAL EXPANSION

CROSS REFERENCE TO RELATED APPLICATION

This application is based on application No 99-66381 filed in the Korean Industrial Property Office on Dec. 30, 1999, the content of which is incorporated hereinto by reference.

BACKGROUND OF THE INVENTION (a) Field of the Invention

The present invention relates to a polyolefin based composite resin composition having a low coefficient of linear thermal expansion, more particularly to a polyolefin-based composite resin composition having a low coefficient of linear thermal expansion which not only exhibits excellent mechanical rigidity, impact resistance, heat resistance, and product flatness, but also has excellent dimensional stability due to its low shrinkage, low coefficient of linear thermal expansion, and low heat sag.

(b) Description of the Related Art

Thermoplastic resins, particularly polyethylene and polypropylene polyolefin-based resins are low in density and inexpensive when compared to other resins, as well as have excellent mechanical properties, processability, etc. These resins are therefore widely used in industries such as in the general purpose plastics, automotive, electronics, and aerospace industries, among others. However, it is difficult to apply polyolefin-based resin to fields requiring special functions due to the property limits of these resins, and this particularly restricts industrial applications since a polypropylene resin with a glass transition temperature of 0° C. has a disadvantage of having low impact strength at low and room temperatures.

Polyolefin-based composite resins, which provide new functions by the blending of heterogeneous resins or the adding of mineral filler, etc. to the resins in order to overcome the above disadvantage, have been developed and are being applied to the various fields in which it was difficult to utilize only a conventional polyolefin-based resin by itself. Examples of the above applications, wherein polyolefin-based resin compositions are widely being used include automobile parts, electronic components, etc. The required properties in these fields are achieved by adding a polypropylene main material, a sort of polyolefin-based resin, ethylene-alpha-olefin copolymer impact reinforcing agents, elastomer, etc., together with a rigidity reinforcing agent inorganic filler. Many compositions have been proposed and are being partially put into practical use by changing the types of the above polypropylene resins and the types and contents of the impact reinforcing agents and rigidity reinforcing agents in order to improve various physical and thermal characteristics.

Generally, a composite resin is a material in which new functions that can not be embodied by the polymer itself are provided by fusing and kneading the primary material of the polymer, fillers, or reinforcing agents with a kneader or an extruder. The types, external aspects, sizes, and contents of the resins, fillers, and reinforcing agents should be selected according to the uses and desired characteristics of the above composite resin in the field of application. As the resin properties are particularly and greatly influenced by the variation of resin processing conditions, the resin processing equipment and processing conditions should be properly selected so that processability, reproducibility, etc. of resin itself can be maintained and the specific properties can be improved by fillers.

Furthermore, the important factors that determine the composite resin characteristics also include the types, contents, etc. of the additives, such as heat resisting stabilizers, weather resisting stabilizers, etc. These are added in order to prevent property deterioration during resin deformation and under the high temperature and pressure environment inside an extruder during the resin processing, or are added to achieve characteristics that are specially required after molding. Interfaces exist among the raw material constituents that have different properties, such as the above polymer, filler, additive, etc. The raw materials, processing equipment, and processing conditions should be carefully selected, taking into account the fact that the composite resin properties are greatly influenced by the interfacial adhesive force at these interfaces.

The resins that are mainly used in the manufacture of a conventional automobile interior and exterior components and electronic components include acrylonitrile-butadiene-styrene copolymer, polycarbonate/acrylonitrile-butadiene-styrene copolymer alloy, polycarbonate/polybutylene terephthalate alloy, polyamide, polyurethane, etc. With the exception of polyamide from among the above resins, the other resins can possibly be replaced with polyolefin-based composite resin when considering aspects of light-weight automobile production, cost reduction, recycling, etc. However, polyamide can not be replaced with polyolefin-based composite resin since there are problems with mechanical properties and thermal characteristics when polyamide is replaced with polyolefin-based composite resin.

In order to replace the above described resins with polyolefin-based composite resins, the polyolefin-based composite resins should have excellent mechanical rigidity, impact resistance, dimensional stability, scratch resistance, etc. It should also have outstanding moldability since component thicknesses, etc. are tending to become thinner due the trend of light-weight automobiles and other components. Furthermore, these polyolefin-based composite resins should require a short molding time in consideration of the aspects of manufacturing expenses and productivity improvements. Finally, coating properties and appearance after the molding of components should be excellent for both coated and non-coated components. Many studies are now in progress on polyolefin-based composite resin compositions in which the above required properties are all satisfied.

Materials having a low contraction rate and a low coefficient of linear thermal expansion are given a great deal of weight in the development of polyolefin-based composite resin compositions which are used in molding large sized components such as automobile components, particularly bumper fascia, door garnish, instrument panels, etc. The properties considered in the raw materials for automobile components include rigidity, tensile strength, elongation, density, heat deflection temperature, coefficient of linear thermal expansion, etc. However, the most important property is the raw material rigidity, which is indicated with flexural modulus and surface hardness. Molded products can be easily bent or sagged when their raw materials do not have sufficient rigidity, since bumper fascia, instrument panels, etc. have a wide surface area compared to their relatively thin thickness. The thickness of molded products has recently tended to becoming thinner in consideration of the aspects of light-weight automobile production and raw material reduction concerns. Due to this trend, the development of raw materials having a higher flexural modulus is required. Furthermore, raw materials having a low coefficient of linear thermal expansion or a low degree of heat sag are required due to needs of the assembling ability and dimensional stability of molded product itself. Additionally, improvements in the flexural modulus are also required.

Generally, plastics have a linear coefficient of expansion that is 4 to 8 times higher when compared to steel, and thus molded products sag or are bent according to weather or temperature variations after assembling the bodyworks. Composite products containing inorganic fillers, which are appropriately added to a basic resin of polypropylene, rubber, etc., have been developed in order to reduce these phenomena. However, it is necessary to harmonize the physical properties of the products by controlling the types and amount of inorganic fillers, since although a product's coefficient of linear thermal expansion is reduced and its flexural modulus is improved, there is still a problem in that the impact strength of such products is lowered at low temperatures. Furthermore, the development of products having low shrinkage is now being required in order to satisfy such conditions as ease of design of the mold for the sake of product molding, dimensional stability during painting, low post-deformation after molding, etc.

Polyolefin-based composite resin compositions employed in the molding of the well known automobile components use crystalline polypropylene as a main constituent. Ethylene-propylene copolymer, having 7 to 12 weight % of ethylene-propylene rubber content and a melt index of 20 to 45 g/10 minutes, and which consists of 92 to 95 weight % of propylene and 5 to 8 weight % of ethylene, is used as an above crystalline polypropylene resin. Furthermore, ethylene-alpha-olefin based rubber, such as ethylene-propylene copolymer, ethylene-octane copolymer, etc. having an alpha-olefin content of 25 to 45 weight %, is added in order to improve the impact resistance of the above crystalline polypropylene resin. Additionally, micro talc having an average particle size of 2 to 4 μm is added and mechanically fused and kneaded using a kneader or an extruder in order to increase the rigidity of the above crystalline polypropylene resin. However, with such a resin, there is a problem in that the generally high priced olefin-based rubber, as well as talc, should be used in large amounts in order to achieve the required improvement of the impact strength and rigidity of the polypropylene-based composite resin composition.

An ultra high rigid composition comprising 55 to 75 weight % of high crystalline ethylene-propylene copolymer having a high melt index for improving moldability, 25 to 45 weight % of crystalline ethylene copolymer having a melting temperature ranging from about 30 to 100° C., and 1 to 25 weight % of micro talc having an average particle size of 5 μm or less is disclosed in European Patent Publication No. 557124. However, it is difficult to apply this composition to automobile products since the high crystalline polypropylene that is used to improve rigidity results in an increase of the composition manufacturing cost. Furthermore, its impact strength is comparatively vulnerable to low temperatures due to its excessive rigidity increase, and paintability also deteriorates due to the composition's increase in crystallinity. Well known technologies related to this are also disclosed in European Patent Publication No. 531,542, European Patent Laid-open Publication No. 596,621, and European Patent Publication No. 496,625.

Furthermore, Korean Patent Laid-open Publication Nos. 99-033557, 99-033558, 99-039953, etc. disclose polyolefin-based composite resin compositions for automobile components. However, there are limitations in the ability of these compositions to satisfy the physical properties that are required in automobile components, since the composite resin compositions are manufactured only by using a single inorganic reinforcing agent.

SUMMARY OF THE INVENTION

The present invention is provide in order to solve the above problems and it is an object of the present invention to provide a polyolefin-based composite resin composition having a low coefficient of linear thermal expansion which not only possesses excellent mechanical rigidity, impact resistance, heat resistance, and product flatness, but also exhibits dimensional stability due to its low shrinkage, low coefficient of linear thermal expansion, and low heat sag.

It is another object of the present invention to provide an automobile exterior component manufactured using a polyolefin-based composite resin composition having a low coefficient of linear thermal expansion which can substitute a polycarbonate/polybutylene terephthalate alloy that is widely used in the molding of automobile exterior components, such as conventional bumper fascia, etc.

In order to accomplish the above objects, the present invention provides a polyolefin-based composite resin composition having a low coefficient of linear thermal expansion comprising a) 40 to 80 weight % of the total composition amount crystalline ethylene-propylene copolymer, b) 5 to 40 weight % of the total composition amount ethylene-alpha-olefin copolymer, c) 5 to 30 weight % of the total composition amount calcium metasilicate based wollastonite, and d) 5 to 30 weight % of the total composition amount inorganic reinforcing agent.

A polyolefin-based composite resin composition having a low coefficient of linear thermal expansion of the present invention can further comprise 0.1 to 5 weight % of the total composition amount additives.

DETAILED DESCRIPTION OF THE INVENTION

In the following detailed description, only the preferred embodiments of the invention have been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

The present invention is described in detail as follows.

In a polyolefin-based composite resin composition having a low coefficient of linear thermal expansion of the present invention, light-weight automobile components can be achieved not only by having a composition in which basic physical properties such as impact resistance, rigidity, heat resistance, etc. are superior, but also by improving injection moldability which results in a thinner wall thickness of molded products. The appearance of the molded products after injection molding is also superior due to the excellent surface flatness of the injected products, and the ease of assembly with the molded products bodywork and dimensional stability of the molded products themselves are improved. Furthermore, post-deformation after painting and molding is minimized, and ease of design of the mold for product molding can be maximized, particularly by lowering mold shrinkage and the coefficient of linear thermal expansion. The respective characteristics of fillers can be manifested to a maximum extent by combining heterogeneous fillers in this invention, as opposed to the use of a single filler in the conventional polyolefin-based composite resin compositions.

First, each of the constituents comprising a polyolefin-based composite resin composition having a low coefficient of linear thermal expansion of the present invention are described further in detail below.

(1) Crystalline ethylene-propylene copolymer

Generally, crystalline ethylene-propylene copolymer is prepared by polymerizing monomer under a combined catalyst of titanium trichloride and alkyl aluminum compound, referred to as a Ziegler-Natta type catalyst, and catalysts such as titan compounds, magnesium compounds, etc. One or more crystalline ethylene-propylene copolymers prepared by polymerizing 1 to 50 weight % ethylene and 50 to 99 weight % propylene under the above catalysts are used in the present invention. The above polymerized crystalline ethylene-propylene copolymer contains 0.5 to 35 weight % ethylene-propylene rubber. Crystalline ethylene-propylene copolymer of the present invention is a resin having a polypropylene melting point of 165° C., a polyethylene melting point of 120° C., and a crystallinity of 20 to 30%, wherein melting points of the above polyethylene and polypropylene are measured by an ordinary method using a Differential Scanning Calorimeter. Crystalline ethylene-propylene copolymer of the present invention have a weight-averaged molecular weight of 190,000 to 265,000 and a number-averaged molecular weight of 37,000 to 50,000, wherein the above weight-averaged molecular weight and number-averaged molecular weight are measured by an ordinary method using Gel Permeation Chromatography. The melt index of crystalline ethylene-propylene copolymer of the present invention is preferably 5 to 60 g/10 minutes (210° C., 2.16 kg), wherein the moldability of the composite resin composition is decreased if the above melt index is 5 g/10 minutes or less, while the impact resistance of the composite resin composition is decreased if melt index exceeds 60 g/10 minutes.

In the polymerization process of crystalline ethylene-propylene copolymer of the present invention, ethylene-propylene rubber is dispersed on crystalline polypropylene matrix in a uniform particle sized state by excessively injecting gas phase ethylene into a reactor so that a large amount of ethylene-propylene rubber is directly prepared in the reactor, and the excessive propylene constituent existing in the produced ethylene-propylene rubber exhibits excellent compatibility with polypropylene so that interfacial adhesive forces are increased so as to improve impact strength. Therefore, as opposed to other general composite resin compositions, a composite resin composition using crystalline ethylene-propylene copolymer resin of the present invention can not only prepare highly cost competitive impact resistant composite resin compositions by remarkably decreasing the ethylene-alpha-olefin copolymer rubber content that is further added for impact resistance reinforcement, but it also can prepare products having uniform physical properties and performance by decreasing the deviation between product lots during the manufacturing of products using the above composite resin composition.

The consumed amount of the above crystalline ethylene-propylene copolymer is preferably from 40 to 80 weight % of the total composition amount, wherein impact strength is decreased when the consumed amount exceeds 80 weight % of the total composition amount, while product moldability is decreased when the consumed amount is 40 weight % or less.

(2) Ethylene-alpha-olefin copolymer

Ethylene-alpha-olefin copolymer of the present invention is used primarily to improve impact strength. 1-propylene, 1-butene, 1-hexene, 1-octene, etc. can be used as the alpha-olefin used in the polymerization of ethylene-alpha-olefin copolymer, wherein these are preferably selectively used according to the application, and more preferably 1-propylene or 1-octene is used. Ethylene-alpha-olefin copolymer of the present invention can preferably be polymerized by mainly using a Ziegler-Natta type catalyst, and more preferably polymerized using a vanadium based or chromium based catalyst. Preferably one or more ethylene-alpha-olefin copolymers having 20 to 50 weight % alpha-olefin content and a melt index of 0.1 to 15 g/10 minutes (230° C., 2.16 kg), and more preferably ethylene-propylene copolymer rubber or ethylene-octene copolymer rubber, are used as ethylene-alpha-olefin copolymer in the present invention. Ethylene-propylene copolymer rubber is used having a propylene content of 20 to 50 weight %, a melt index of 0.1 to 5 g/10 minutes (230° C., 2.16 kg), a Mooney viscosity of 19 to 85 $ML_{1+4}$ (100° C.), and a specific gravity of 0.86 g/cm$^3$, and ethylene-octene copolymer rubber is used having an octene content of 20 to 50 weight %, preferably 20 to 30 weight %, a melt index 0.1 to 15 g/10 minutes (230° C., 2.16 kg), and a Mooney viscosity of 19 to 50 $ML_{1+4}$ (121° C.).

The consumed amount of the above ethylene-alpha-olefin copolymer is preferably 5 to 40 weight % of the total composition amount, and more preferably 5 to 20 weight %, wherein the above consumed amount is preferably maintained within this range since the product's impact strength is decreased when the consumed amount is 5 weight % or less, and the product's mechanical strength is deteriorated, although the product impact strength is enhanced, when the consumed amount exceeds 40 weight %.

(3) Wollastonite

The inorganic reinforcing agent of the present invention is added to a resin composition for product reinforcement. A calcium metasilicate based compound of wollastonite is used as an inorganic reinforcing agent of the present invention. The aspect ratio of wollastonite is preferably from 10 to 19, and needle-shaped wollastonite having an average particle diameter of 3 to 25 μm is preferable. The consumed amount of the above calcium-metasilicate based compound is preferably 5 to 30 weight % of the total composition amount, wherein the above consumed amount is preferably maintained within this range since the enhancement of the product's rigidity is not sufficient when the consumed amount is 5 weight % or less, and impact strength is deteriorated when the consumed amount exceeds 30 weight %.

(4) Inorganic Reinforcing Agent

An inorganic reinforcing agent of the present invention is added in order to prevent deterioration of the product impact resistant strength caused by using fillers and to reinforce the product rigidity. Talc, calcium-carbonate, mica, glass fiber, asbestos, kaolin, etc. can be used as an inorganic reinforcing agents in the present invention, however, it is preferably to use talc. When talc is used as an inorganic reinforcing agent, a fragmentary flat-shaped talc having an aspect ratio of 3 to 20 and an average particle diameter of 2 to 4 μm is preferably used. Talc is used in which interfacial adhesive forces are increased by pulverizing the raw talc stone with a pulverizer, such as a roller mill, crusher, etc., and separating it by using a desired distributor, and depending on circumstances, chemically treating its surface.

The consumed amount of the above inorganic reinforcing agent is preferably 5 to 30 weight % of the total composition amount, wherein the above range of consumed amount is preferably maintained since the product rigidity is not sufficiently reinforced when the consumed amount is 5 weight % or less, and moldability and impact strength are deteriorated, although the product rigidity is sufficiently reinforced, when the consumed amount exceeds 30 weight %.

(5) Additives

Crystalline polyolefin-based composite resin compositions of the present invention can further comprise appropriate additives depending on the application. Coupling agents, primary or secondary oxidation prohibitors, ultraviolet rays stabilizer, process lubricant, and antistatic agents are essentially contained in a composite resin composition as additives of the present invention, and heat resistant stabilizers, carbon black, pigment, nucleators, etc. can further be included according to the composite resin application. The above coupling agents that are used to increase adhesion strength between the crystalline ethylene-propylene copolymer and the inorganic reinforcing agent include those that are amino silane based, amino titanium based, etc., and preferably include coupling agents that are ordinary amino silane based or amino titanium based. The consumed amount of the above coupling agent is preferably 0.05 to 3 weight % of the total composition amount.

The above primary or secondary antioxidant and heat resistant stabilizer are used to prevent thermal decomposition which can occur during the processing of the polyolefin-based composite resin of the present invention. An ordinary phenol based compound, etc., preferably phenol based antioxidant of 2,6-di-t-butyl-4-methylphenol, is used as a primary antioxidant, wherein the consumed amount of the above primary antioxidant is preferably 0.05 to 0.5 weight %.

An ordinary amine based compound, etc., preferably an amine based diphenyl-p-phenylenediamine antioxidant is used as a secondary antioxidant, wherein the consumed amount of the above secondary antioxidant is preferably 0.05 to 0.5 weight %.

An ordinary phenol based compound such as 2,6-di-t-butyl-4-methylphenol, etc. and an ordinary amine based compound such as diphenyl-p-phenylenediamine, etc. can be used as a heat resistant stabilizer, wherein the consumed amount of the above heat resistant stabilizer is preferably 0.05 to 1.0 weight % of the total composition amount.

The above ultraviolet rays stabilizer is added to a composite resin composition to reinforce the composite resin's weatherability and prevent decomposition which can occur during the exposure of the composite resin to ultraviolet rays. An ordinary hindered amine light stabilizers (HALS) based compound, benzophenone based compound, benzotriazole based compound, etc., preferably an HALS based compound of poly-{[6-(1,1,3,3-tetramethylbutyl)amino-1,3,5-triazine-2,4-diyl][2-(2,2,6,6-tetramethylpiperidyl)amino]-hexamethylene-[4-(2,2,6,6-tetramethylpiperidyl)-amino]}, is used as an ultraviolet rays stabilizer, wherein the consumed amount of the above ultraviolet rays stabilizer is preferably 0.05 to 0.5 weight % of the total composition amount.

The above process lubricant is added to improve the processibility of composite resin composition. An ordinary calcium stearate, zinc stearate, etc., preferably calcium stearate, is used as a process lubricant, wherein the consumed amount of the above process lubricant is preferably 0.05 to 0.1 weight % of the total composition amount.

The above antistatic agent is added to a composite resin composition to prevent the static electricity of composite resin. An ordinary alkylamine based compound, stearic acid based compound, etc. is used as an antistatic agent, wherein the consumed amount of the above antistatic agent is preferably 0.05 to 0.1 weight % of the total composition amount.

Furthermore, additional additives such as carbon black, pigment, nucleator, etc. can further be added to a polyolefin-based composite resin composition according to their application for the manifestation of color and enhancemment of weatherability, wherein the consumed amount of the above additional additives is preferably 0.1 to 5 weight % of the total composition amount.

Raw materials are mixed using a Henssel blender, ribbon blender, V-blender, etc., or by directly supplying each type of raw material into processing equipment in a predetermined ratio from the equipment supplying each of the different raw materials in order to obtain a resin composition of the present invention, wherein a uniaxial extruder, a biaxial extruder, a biaxial extruder in which another part of it can be used as a feeding inlet besides its feeding inlet, a kneader mixer, a Banbury mixer, etc. can be used as processing equipment depending on the raw materials and final composition characteristics. After fusing and mixing constituents of a composite resin composition of the present invention with the above processing equipment, the composition is formed into a pellet. Preferably, since the physical properties and performance of a resin composition can be changed depending on the processing conditions, optimum processing conditions are chosen and a composite resin composition is prepared mainly by varying the number of screw revolutions, extrusion output, processing temperature, etc. of a biaxial extruder in which another part of the extruder can be used as a feeding inlet besides its feeding inlet.

After removing moisture and volatile matter by passing the above prepared composite resin composition through a certain moisture and volatile matter removing process, the composite resin composition is formed into test pieces for injection and compression. The mechanical and thermal properties of the composite resin composition are then measured by standards such as those of the American Society for Testing and Materials. Physical properties of the composite resin composition are also evaluated by instituting standards for the composite resin composition itself, as needed. Test pieces manufactured by injection molding are mainly used as test pieces for measuring the above composite resin physical properties, and the injection molding of the above test pieces is carried out using an ordinary injection machine, wherein the cylinder temperature is from 200 to 230° C., the mold temperature is from 30 to 60° C., and injection pressure, intensification pressure, and injecting speed are fixed in a range where the composite resin has excellent physical properties. After injecting injection test pieces for measuring the above physical properties, these pieces were left alone for about 48 hours under a 23° C. temperature and 50% relative humidity environment, and then the test piece physical properties were measured. The physical property measurements of the above prepared composite resin was made on the composite resin's melt index, tensile strength, flexural modulus, impact strength, heat deflection temperature, coefficient of linear thermal expansion, mold shrinkage, and heat sag, wherein each of measurements of the physical properties use ordinary methods written in standards, such as the American Society for Testing and Materials, etc.

Hereinafter, preferred EXAMPLES are provided in order to help in the gaining of an understanding of the present invention. However, the following EXAMPLES are only for the further understanding the present invention, and the present invention is not limited to the following EXAMPLES.

EXAMPLES 1 TO 8

After fusing and mixing constituents represented in the following Table 1 in a composition of the following Table 1 using a biaxial extruder (where the screw L/D was 52, Φ was 52, the revolution number was 300 revolutions per minute, the extruding output was 100 kg/hr, and the processing temperature was from 200 to 220° C.) of which another part of the extruder could be used as a feeding inlet besides its own feeding inlet, a polyolefin-based composite resin composition was manufactured in pellet form.

TABLE 1

| Compositions | Ex 1 | Ex 2 | Ex 3 | Ex 4 | Ex 5 | Ex 6 | Ex 7 | Ex 8 |
|---|---|---|---|---|---|---|---|---|
| A1 (weight %) |  |  |  |  |  |  |  |  |
| A2 (weight %) | 17 |  |  |  |  |  |  |  |
| A3 (weight %) | 34 | 51 | 50 | 47 | 48 | 50 | 32 | 34 |
| A4 (weight %) |  |  |  |  |  |  | 15 | 16 |
| B1 (weight %) | 16 |  | 8 | 10 |  |  |  | 10 |
| B2 (weight %) |  |  |  | 10 | 5 |  |  |  |
| B3 (weight %) |  |  |  |  |  |  |  |  |
| B4 (weight %) | 10 | 9 | 7 | 8 | 10 | 10 | 14 | 10 |
| B5 (weight %) |  | 16 | 10 |  | 10 | 13 | 14 | 8 |
| F1 (weight %) |  |  |  |  |  |  |  |  |
| F2 (weight %) | 5 | 5 | 8 | 5 | 5 | 10 | 8 | 5 |
| F3 (weight %) | 16 | 17 | 15 | 18 | 20 | 15 | 15 | 15 |
| Additives | 2 | 2 | 2 | 2 | 2 | 2 | 2 | 2 |

In the above Table 1, A1 to A4 are crystalline ethylene-propylene copolymers having the different physical properties which are represented in the following Table 2, B1 to B5 are ethylene-alpha-olefin copolymer rubbers having the different physical properties which are represented in the following Table 3, F1 and F2 are inorganic reinforcing agents, F3 is wollastonite, and their respective physical properties are represented in the following Table 4.

TABLE 2

| Physical properties | A1 | A2 | A3 | A4 |
|---|---|---|---|---|
| Melt index (g/10 minutes) | 21 | 30 | 50 | 20 |
| Ethylene content (weight %) | 8.0 | 7.8 | 8.0 | 48.8 |
| Weight-average molecular weight | 215,000 | 199,000 | 189,000 | 180,000 |

TABLE 3

| Physical properties | B1 | B2 | B3 | B4 | B5 |
|---|---|---|---|---|---|
| Melt index (g/10 minutes) | 3.2 | 0.6 | 0.6 | 0.7 | 13 |
| Alpha-olefin form | $C_3$ | $C_3$ | $C_3$ | $C_8$ | $C_8$ |
| Alpha-olefin content (weight %) | 27 | 28 | 43 | 28 | 28 |

TABLE 4

| | F1 calcium carbonate | F2 talc | F3 Wollastonite |
|---|---|---|---|
| Shape | spherical shape | fragmental flat shape | needle shape |
| Average diameter (μm) | 7 | 3 | 8 |
| Average aspect ratio | — | 10 | 17 |

Furthermore, the additives in the above Table 1 were added to a composite resin composition in contents represented in the following Table 5, wherein the additive contents are a weight % of the total composition amount.

TABLE 5

| Additives | Chemical formula | Contents (weight %) |
|---|---|---|
| Process lubricant | calcium stearate | 0.1 |
| Primary antioxidant | Tetrakis[methylene(3,5-di-tetra-butyl-4-hydroxy-hydrocinnamate)]methane | 0.1 |
| Secondary antioxidant | Tris(2,4-di-tetra-butylphenyl)-phosphate | 0.1 |
| Antistatic agent | alkylamine based | 0.1 |
| Ultraviolet rays stabilizer | Poly-{[6-(1,1,3,3-tetramethylbutyl)-amino-1,3,5-triazine-2,4-diyl][2-(2,2,6,6-tetramethyl-piperidyl)-amino]-hexamethylene-[4-(2,2,6,6-tetramethyl-piperidyl)-amino]} | 0.1 |
| Coupling agent | Amino silane based or amino titanium based | 1.0 |
| Carbon black | | 0.5 |

COMPARATIVE EXAMPLES 1 TO 8

A pellet type polyolefin based composite resin composition was manufactured from constituents represented in the following Table 6 in compositions indicated in the following Table 6 by the same method as in Example 1.

TABLE 6

| Compositions | Com. Ex 1 | Com. Ex 2 | Com. Ex 3 | Com. Ex 4 | Com. Ex 5 | Com. Ex 6 | Com. Ex 7 | Com. Ex 8 |
|---|---|---|---|---|---|---|---|---|
| A1 (weight %) | 27 |  | 35 |  | 35 | 22 |  |  |
| A2 (weight %) | 30 | 15 |  | 22 |  | 28.5 |  | 22 |
| A3 (weight %) |  | 35 |  |  |  |  | 46.5 | 38.5 |
| A4 (weight %) |  |  |  | 15 | 30 | 23 |  |  |
| B1 (weight %) | 12 | 10 |  | 5 |  | 10 |  | 16 |
| B2 (weight %) |  |  |  | 7 | 6 |  |  |  |
| B3 (weight %) |  |  | 17 | 12 |  | 8.5 |  |  |
| B4 (weight %) | 13 |  |  |  | 6 | 5 | 15 | 9 | 10 |
| B5 (weight %) |  |  |  |  | 8 |  | 11 | 16 |
| F1 (weight %) | 15 | 20 | 23 | 25 |  |  |  |  |
| F2 (weight %) |  |  |  |  | 15 | 20 | 25 | 10 |
| F3 (weight %) |  |  |  |  |  |  |  |  |
| Additives | 2 | 2 | 2 | 2 | 2 | 2 | 2 | 2 |

TEST EXAMPLES

After removing moisture and volatile matter contained in polyolefin-based composite resin compositions prepared by the above Examples 1 to 8 and Comparative Examples 1 to 8, composite resin test pieces were manufactured using an injecting machine made by the Goldstar Corporation of Korea (model name: IDE90EN) under the conditions of a 220° C. cylinder temperature and a 60° C. mold temperature. After leaving the above test pieces alone for 48 hours under a 23° C. temperature and 50% relative humidity environment, the melt index, tensile strength, flexural modulus, impact strength, heat deflection temperature, coefficient of linear thermal expansion, mold shrinkage, and heat sag were measured, and their measurement results are represented in the following Tables 7 and 8.

(3) Flexural Strength and Flexural Modulus was measured by the methods prescribed in the American Society for Testing and Materials (ASTM) standard D790 (crosshead speed=10 mm/minute).

TABLE 7

| Physical properties | Ex 1 | Ex 2 | Ex 3 | Ex 4 | Ex 5 | Ex 6 | Ex 7 | Ex 8 |
|---|---|---|---|---|---|---|---|---|
| Melt index (g/10 minutes) | 23 | 21 | 21 | 20 | 18 | 18 | 25 | 23 |
| Tensile strength (kg/cm$^2$) | 180 | 190 | 185 | 190 | 190 | 185 | 185 | 190 |
| Flexural modulus (kg/cm$^2$) | 15500 | 17000 | 17500 | 19000 | 24000 | 23000 | 18000 | 20000 |
| Izod impact strength (room temperature, kg-cm/cm) | NB* | NB | NB | NB | NB | NB | NB | NB |
| Izod impact strength (−30 °C., kg-cm/cm) | 7.0 | 6.4 | 6.1 | 5.2 | 4.9 | 5.0 | 6.5 | 5.5 |
| Heat deflection temperature (° C.) | 108 | 110 | 110 | 113 | 115 | 115 | 110 | 112 |
| Coefficient of linear thermal expansion (× 10-5) (mm/mm-° C.) | 4.6 | 4.8 | 4.5 | 4.3 | 4.3 | 4.0 | 4.3 | 4.4 |
| Mold shrinkage (0.1%) | 3.9 | 3.7 | 3.0 | 3.0 | 3.0 | 3.0 | 4.0 | 3.8 |
| Heat sag (mm) | 3.5 | 3.8 | 3.4 | 4.0 | 3.9 | 3.9 | 4.1 | 4.0 |

*NB: non-break

TABLE 8

| Physical properties | Com. Ex 1 | Com. Ex 2 | Com. Ex 3 | Com. Ex 4 | Com. Ex 5 | Com. Ex 6 | Com. Ex 7 | Com. Ex 8 |
|---|---|---|---|---|---|---|---|---|
| Melt index (g/10 minutes) | 14 | 15 | 15 | 16 | 15 | 16 | 17 | 17 |
| Tensile strength (kg/cm$^2$) | 170 | 169 | 170 | 165 | 165 | 170 | 170 | 175 |
| Flexural modulus (kg/cm$^2$) | 9500 | 10200 | 10000 | 12000 | 11000 | 12000 | 13000 | 9500 |
| Izod impact strength (room temperature, kg-cm/cm) | NB | NB | NB | NB | NB | NB | NB | NB |
| Izod impact strength (−30° C., kg-cm/cm) | 6.0 | 5.5 | 5.2 | 5.2 | 6.5 | 6.2 | 6.0 | 6.4 |
| Heat deflection temperature (° C.) | 95 | 93 | 98 | 100 | 100 | 102 | 103 | 100 |
| Coefficient of linear thermal expansion (× 10-5) (mm/mm-° C.) | 7.0 | 7.2 | 7.5 | 7.3 | 5.8 | 6.1 | 6.0 | 6.1 |
| Mold shrinkage (0.1%) | 6.8 | 7.0 | 7.2 | 7.0 | 7.2 | 7.4 | 7.2 | 7.5 |
| Heat sag (mm) | 5.2 | 5.5 | 6.0 | 5.8 | 5.7 | 5.8 | 5.7 | 6.3 |

*NB: non-break

The measuring methods of the above physical properties were performed according to the following procedures.

(1) The Melt Index was measured by the methods prescribed in the American Society for Testing and Materials (ASTM) standard D1238 (230° C., 2.16 kg), and an automatic measuring device, along with a manual measuring device, were used.

(2) Tensile Strength and Elongation was measured by the methods prescribed in the American Society for Testing and Materials (ASTM) standard D683 (Type I, crosshead speed=50 mm/minute).

(4) Impact Strength was measured at room temperature and at a low temperature (−30° C.) by the methods prescribed in the American Society for Testing and Materials (ASTM) standard D256, wherein weight of the pendulum was 5 pounds.

(5) Heat Deflection Temperature was measured by the methods prescribed in the American Society for Testing and Materials (ASTM) D648. At this time, the load was 4.16 kg.

(6) Mold shrinkage was measured by the methods prescribed in the American Society for Testing and Materials (ASTM) standard D955.

(7) The Coefficient of Linear Thermal Expansion was measured by the methods prescribed in the American Society for Testing and Materials (ASTM) standard D696, wherein the dimension change was measured by varying the temperature from −30 to 80° C.

(8) Heat Sag was measured by a method wherein after fixing test pieces of 110 mm (length)×20 mm (width)×3 mm (height) in the horizontal direction parallel to the floor, they were put into an oven at 120° C. and left there for about one hour. Then the alteration in the dimensions of test pieces was noted by measuring before and after heating.

(9) A Comparison of Painting Adhesive Properties was performed by the method wherein after painting chlorinated polypropylene primer to a thickness of 5 to 7 μm on composite resin test pieces of 50 mm (length)×100 mm (width)×2 mm (height), urethane based paint was painted to a thickness of 20 to 30 μm and cured in an oven at 85° C. for about 30 minutes and then left alone at room temperature for about 24 hours. After that, the painting adhesive properties were compared with tape by manufacturing one hundred 2 mm grids.

A polyolefin-based composite resin composition having a low coefficient of linear thermal expansion of the present invention in which basic physical properties such as mechanical strength, impact resistance, heat resistance, etc. are harmonized, and in which the injection moldability is improved, the heat sag is especially lessened, and the mold shrinkage and coefficient of linear thermal expansion are lowered thereby improving its ability to be easily assembled with bodywork, provides dimensional stability to molded products so as to replace an alloys of polycarbonate and polybutylene terephthalate that are now widely used in the conventional automobile exterior component molding. Therefore, polyolefin-based composite resin compositions of the present invention can contribute in the production of lightweight automobile components and can be widely used for automotive component materials having excellent appearance.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A polyolefin-based composite resin composition having a low coefficient of linear thermal expansion comprising:
   a) crystalline ethylene-propylene copolymer as 40 to 80 weight % of the total composition amount;
   b) ethylene-alpha-olefin copolymer as 5 to 40 weight % of the total composition amount;
   c) calcium-metasilicate based wollastonite as 5 to 40 weight % of the total composition amount; and
   d) inorganic reinforcing agent as 5 to 30 weight % of the total composition amount, wherein the inorganic reinforcing agent is selected from the group consisting of mica, glass fiber, asbestos, and kaolin.

2. A polyolefin-based composite resin composition having a low coefficient of linear thermal expansion in accordance with claim 1, wherein the crystalline ethylene-propylene copolymer is one or more ethylene-propylene copolymers containing 0.5 to 50 weight % of ethylene and 50 to 99 weight % of propylene in which 0.5 to 35 weight % of ethylene-propylene rubber is contained and having a melt index of 5 to 60 g/10 minutes (230° C., 2.16 kg).

3. A polyolefin-based composite resin composition having a low coefficient of linear thermal expansion in accordance with claim 1, wherein the ethylene-alpha-olefin copolymer is one or more ethylene-alpha-olefin copolymers containing 20 to 50 weight % of alpha-olefin and having a melt index of 0.1 to 15 g/10 minutes (230° C., 2.16 kg).

4. A polyolefin-based composite resin composition having a low coefficient of linear thermal expansion in accordance with claim 1, wherein the alpha-olefin in the ethylene-alpha-olefin copolymer is an alpha-olefin selected from the group consisting of 1-propylene, 1-butene, 1-hexene, and 1-octene.

5. A polyolefin-based composite resin composition having a low coefficient of linear thermal expansion in accordance with claim 1, wherein the ethylene-alpha-olefin copolymer comprises 5 to 20 weight % of ethylene-propylene copolymer rubber containing 20 to 50 weight % of propylene and having a melt index of 0.1 to 5 g/10 minutes (230° C., 2.16 kg).

6. A polyolefin-based composite resin composition having a low coefficient of linear thermal expansion in accordance with claim 1, wherein the ethylene-alpha-olefin copolymer comprises 5 to 20 weight % of ethylene-octane copolymer rubber containing 20 to 50 weight % of octane and having a melt index of 0.1 to 15 g/10 minutes (230° C., 2.16 kg).

7. A polyolefin-based composite resin composition having a low coefficient of linear thermal expansion in accordance with claim 1, wherein the calcium-metasilicate based wollastonite has an average particle diameter of 5 to 25 μm and an aspect ratio of 10 to 19.

8. A polyolefin-based composite resin composition having a low coefficient of linear thermal expansion in accordance with claim 7, wherein the talc is in a fragmental flat shape, and has an average particle size of 2 to 4 μm and an aspect ratio of 3 to 20.

9. A polyolefin-based composite resin composition having a low coefficient of linear thermal expansion in accordance with claim 1 further comprising 0.05 to 0.5 weight % of phenol based primary antioxidant or amine based secondary antioxidant, 0.05 to 0.5 weight % of HALS based ultraviolet rays stabilizer, 0.05 to 0.1 weight % of process lubricant, 0.05 to 3 weight % of amino silane based or amino titanium based coupling agent, and 0.05 to 0.1 weight % of alkylamine based antistatic agent based on the total composition amount.

10. Automobile exterior components manufactured using a polyolefin-based composite resin composition having a low coefficient of linear thermal expansion of claim 1.

* * * * *